United States Patent [19]
Reuter

[11] Patent Number: 5,942,837
[45] Date of Patent: Aug. 24, 1999

[54] HIGHLY DYNAMIC PIEZO-ELECTRIC DRIVE MECHANISM

[75] Inventor: Martin Reuter, Dachau, Germany

[73] Assignee: MDC Max Dätwyler Bleienbach AG, Bleienbach, Switzerland

[21] Appl. No.: 08/828,163

[22] Filed: Mar. 27, 1997

[30] Foreign Application Priority Data

Apr. 2, 1996 [DE] Germany .............................. 196 13 158

[51] Int. Cl.⁶ ................................................... H01L 41/08
[52] U.S. Cl. .............................................................. 310/328
[58] Field of Search ................................. 310/323, 328, 310/331

[56] References Cited

U.S. PATENT DOCUMENTS 5,726,520  3/1998  Grahn ...................................... 310/328

FOREIGN PATENT DOCUMENTS

| | | | |
|---|---|---|---|
| 0 345 920 | 12/1989 | European Pat. Off. | |
| 44 45 642 A1 | 6/1996 | Germany . | |
| 60-187270 | 9/1985 | Japan . | |
| 2-277012 | 11/1990 | Japan . | |
| 6-170762 | 6/1994 | Japan . | |
| 8-308262 | 11/1996 | Japan . | |

OTHER PUBLICATIONS

Patent Abstracts of Japan, vol. 013, No. 351 (P–912) Aug. 7, 1989 & JP 01 109536 A (Fujitsu Ltd), Apr. 26, 1989.
Patent Abstracts of Japan, vol. 010, No. 027 (E–378), Feb. 4, 1986 & JP 60 187270 A (Nippon Denshin Denwa Kosha), Sep. 24, 1985.

*Primary Examiner*—Mark O. Budd
*Attorney, Agent, or Firm*—Alston & Bird LLP

[57] ABSTRACT

A highly dynamic piezo-electric drive mechanism for use wherever stringent requirements are placed on resonant frequency, positioning time, actuation speed or acceleration, is provided and in which at least two piezo-electric double stack drives are rigidly mounted on their first base surfaces and act against a toggle lever on their second base surface on opposite sides of and equidistant from the pivot axis of the toggle lever, and a control applies a phased electrical voltage to the piezo-electric stacks in such manner that the double stack drives operate in a push-pull mode.

22 Claims, 5 Drawing Sheets

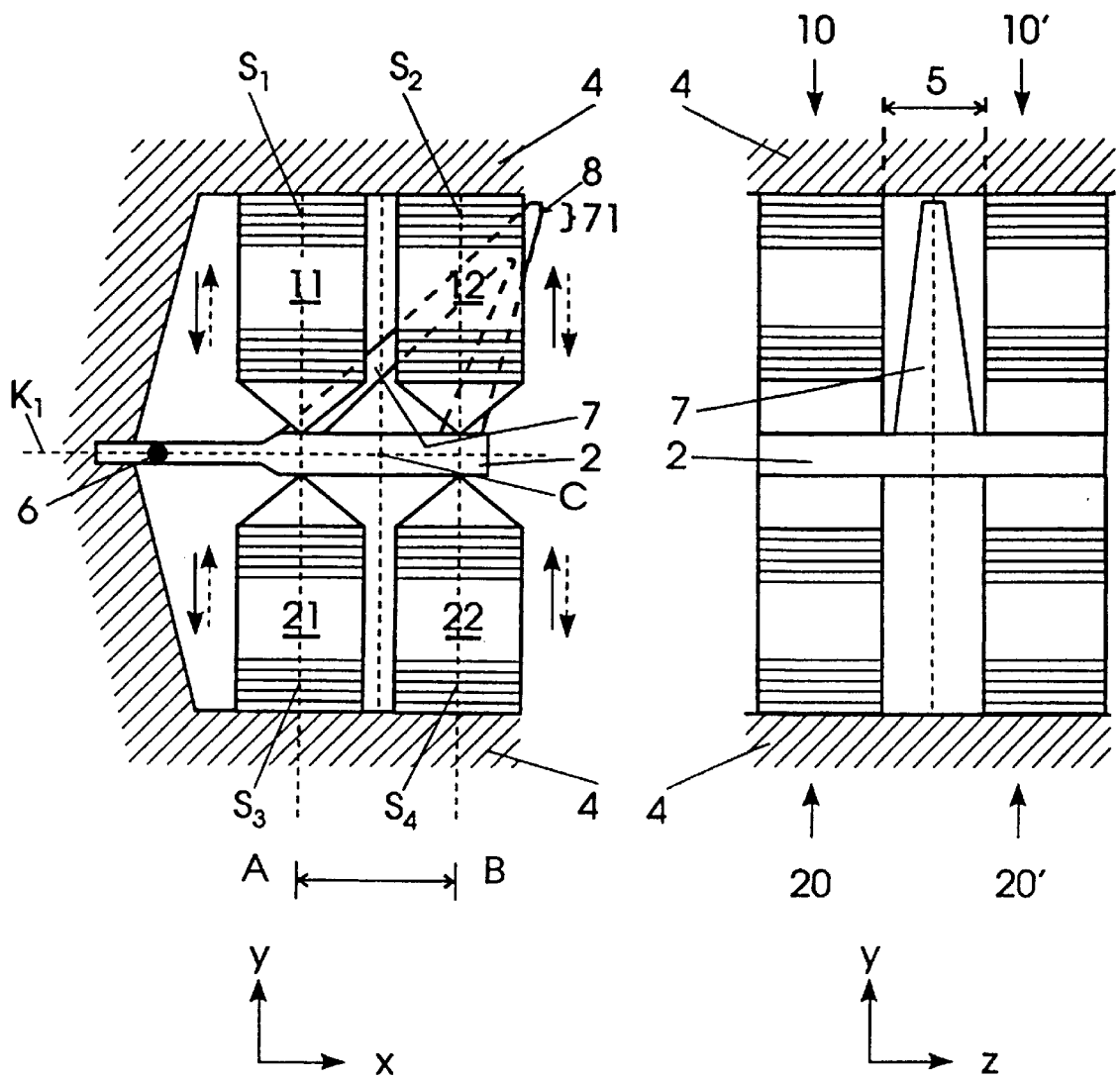
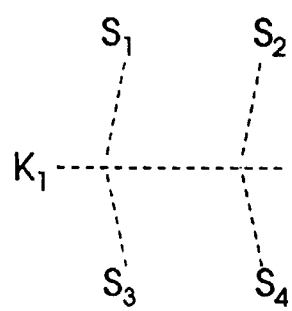
Fig. 4
Fig. 4a
Fig. 4b

HIGHLY DYNAMIC PIEZO-ELECTRIC DRIVE MECHANISM

FIELD OF THE INVENTION

The invention relates to a highly dynamic piezo-electric drive which is used wherever stringent requirements are placed on the resonant frequency, the positioning time, the actuation speed or acceleration of a piezo-electric drive system. Preferred fields of application of the invention are, for example:

drives for tools for mechanical engraving of printing rolls, positioning devices for surface scanning in a plane, tilting mirrors which require positioning times in the sub-millisecond range in an actuating range of 1–2°, and valve drives for highly dynamic switching and proportional operation.

BACKGROUND OF THE INVENTION

Piezo-electric drive and adjusting elements are already known. In their simplest form, a piezo-electric element can be supported on a stationary mount and can press against an adjustable component. If an electrical voltage is applied to the piezo-electric element, this element moves and the adjustable component is deflected. Such piezo-electric elements have achieved certain usage as driving or adjusting elements. However, the small movement of a piezo-electric component, even in stacks formed from individual elements with stack heights of 20 mm, is not greater than about 20–30 μm with the maximum permissible excitation voltage, and is generally considered a deficiency or disadvantage. Attempts have been made to compensate for a small movement by coupling the piezo-electric element(s) to lever structures which increase or even compound the movement.

Such a piezo-electric element and lever arrangement is widely used as a precision drive, for example, for adjustment tasks (cf. company catalogue from the Physik Instruments Company, Waldbronn [1994]). The disadvantages of such arrangements, particularly when they are installed in an apparatus, are that the piezo-electric element always has to carry out work against the lever structures and corresponding restoring means, and that fluctuating forces and temperatures produce changes in the length of the piezo-electric element. In particular, different thermal coefficients of expansion of the piezo-electric material and of the material of the rest of the apparatus, for example, steel, have a disadvantageous effect. In order to compensate for this effect, the actuating elements must either be readjusted in the event of temperature changes or else must be reset automatically, by means of a sensitive position measurement system, at the expense of the available actuation range. However, these measures require an additional outlay which is sometimes considerable.

Furthermore, because of the restoring means, these types of arrangements have a low intrinsic stiffness so that they can operate only quasi-statically with short reaction times.

In order to overcome these problems, piezo double-stack drives have already been proposed, in which two identical piezo-electric stacks act on one side of a toggle lever arrangement (F&M, Journal for Electronics, Optics and Microsystem Engineering, 104th Year 1996, page 70 ff.). Such arrangements lead to extremely prestressed stiff structures which exhibit good dynamic characteristics even without any loss of their own travel or movement. A further advantage is the intrinsic thermal compensation of these systems. To produce a sufficient drive travel with adequate drive forces, the toggle levers which are used must, however, be designed to be sufficiently robust to allow them to absorb the bending forces which act on them. This means that the toggle levers must have a suitable mass, so that adequate resonant frequencies can no longer be achieved for a predetermined travel and a predetermined step-up ratio for some applications.

SUMMARY OF THE INVENTION

With the foregoing in mind, it is an object of the present invention to provide a highly dynamic piezo-electric drive which achieves very high resonant frequencies for a predetermined travel and with a predetermined drive force.

This object of the present invention is achieved by providing an arrangement of at least two piezo-electric double stack drives which has operating frequencies considerably above those of the known prior art. The arrangement of at least two double stack drives provides increased stiffness of the drives and includes a toggle lever construction of reduced mass and on which opposing stresses are compensated or significantly reduced. In addition, the present invention provides an attachment for the toggle lever which moves with the toggle lever and transfers such movement from the toggle lever to a point outside the drive mechanism while increasing such movement.

BRIEF DESCRIPTION OF THE DRAWINGS

The invention will be explained in more detail in the following text with reference to exemplary embodiments and associated schematic drawings, in which:

FIG. 4 shows a particularly preferred embodiment of a highly dynamic drive using four double stack drives according to the present invention;

FIG. 4a shows a side view of the layout according to FIG. 4;

FIG. 4b shows a schematic variant according to FIG. 4; and

DETAILED DESCRIPTION OF THE ILLUSTRATED EMBODIMENTS

Figures 1, 1A:
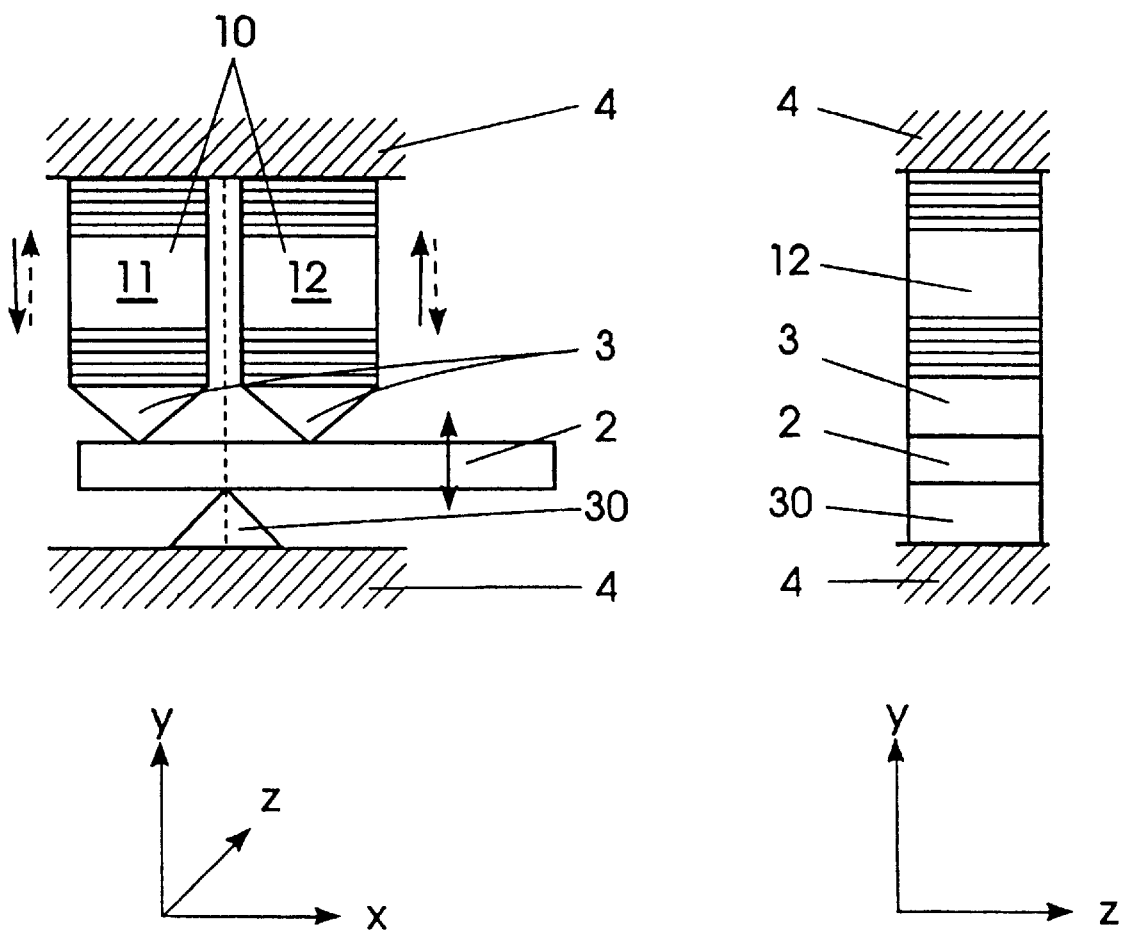
FIG. 1 shows a view of a schematic layout of a piezo-electric double stack drive according to the prior art.
FIG. 1a shows a side view of a layout according to FIG. 1.

FIG. 1 shows a schematic view of a double stack drive 10, with its essential assemblies, according to the prior art. In this case, two individual piezo-electric stacks 11, 12, which are as close to one another as possible, are linked, with a mechanical prestress which can be predetermined, such that on one side they rest firmly on a rigid mount 4. On the other side, the individual stacks 11, 12 are hinged on a toggle lever 2 by way of jointed links 3, which are preferably designed as solid body joints. The toggle lever 2, for its part, is likewise linked by way of a solid body joint 30 to a rigid mount 4. In this arrangement, the toggle lever 2 is extended outwardly to pass out the deflecting movements thereof which are used, for example, for valve control systems. By applying antiphase electrical voltages to the piezo-electric stacks 11 and 12 about a central offset value, one stack is caused to expand while the other contracts, and vice versa. These movement directions, which are indicated by arrows alongside the stacks 11 and 12, cause the toggle lever 2 to carry out deflection movements corresponding to the double arrow illustrated on it. When reference is made to coordinate directions in the following text, this refers to the Cartesian coordinate system which is illustrated in FIG. 1. FIG. 1a shows a side view of FIG. 1, corresponding to the indicated viewing direction. This arrangement according to the prior art is subject to the disadvantages described above.

Figure 2:
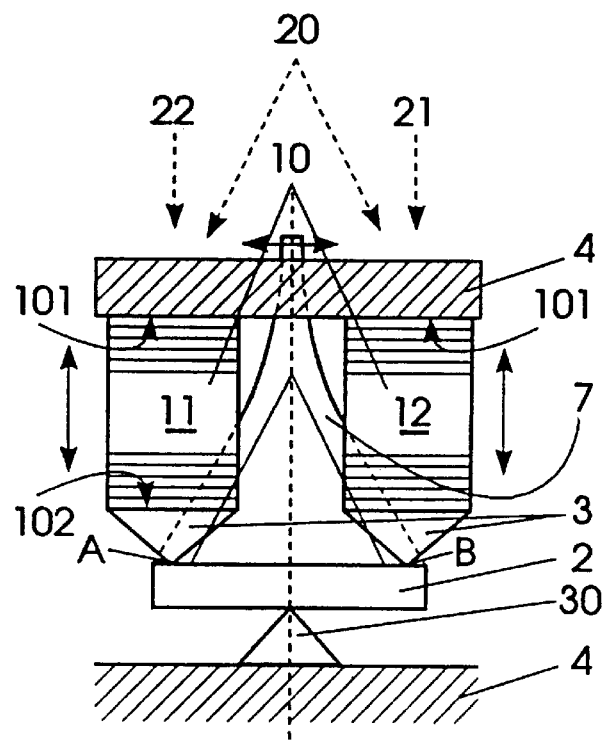
FIG. 2 shows one possible embodiment of a highly dynamic drive using two double stack drives according to the present invention.

One possible embodiment of a highly dynamic drive using two double stack drives according to the present invention is illustrated in FIG. 2, in which like reference characters are used to refer to like or similar elements. Special embodiments of individual stack geometries used here are explained in more detail in the figure description relating to FIG. 5. In addition to the double stack drive 10, a second double stack drive 20 is arranged, super-imposed, to the layout of a double stack drive 10 which is known in principle and comprises individual piezo-electric stacks 11, 12 whose first base surfaces 101 are mounted on and act against a rigid mount 4 and whose second base surfaces 102 act, in each case via jointed links 3, on a toggle lever 2. This second double stack drive 20 is located at a certain distance, which is referred to as the intermediate space 5 (FIG. 2a) in the following text, from the double stack drive 10 and grips the toggle lever 2 in the same manner as the double stack drive 10. The individual stacks 11 and 12, 21 and 22 have an electrical AC voltage applied to them, phase-shifted as described above, the stacks 11 and 22, 12 and 21 in each case contracting or expanding in the same manner.

In principle it can be said that the system stiffness and the active inertia forces of both the double stack drives 10, 20 and of the toggle lever 2, as well as additionally coupled external masses which act on the toggle lever 2, are the essential influencing variables on the achievable resonant frequency, to be precise acting in opposite directions. Since deformation of the toggle lever 2 is to be avoided, its structural design and thus its inertial mass cannot be reduced indefinitely. Furthermore, it is necessary to take account of the fact that any increase in the drive stiffness, as proposed here, does not initially produce an increase in the resonant frequency, since the inertia forces rise to the same extent. The solution to this problem according to the invention is discussed in more detail in the context of the figure description relating to FIG. 5.

Figure 2A:
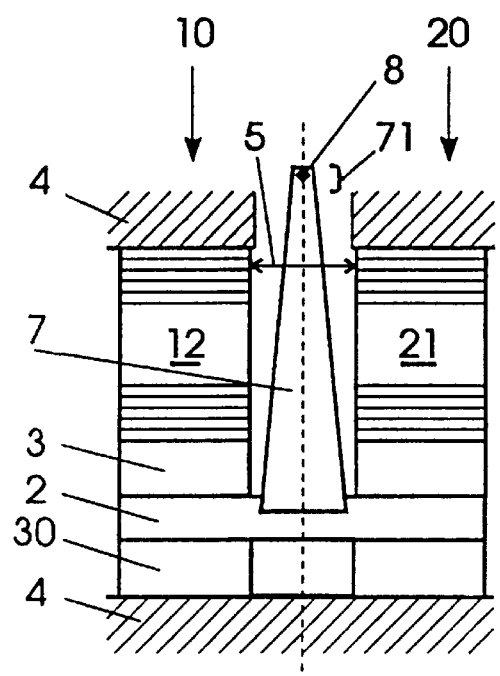

With reference to FIGS. 2 and 2a, it is intended to discuss in more detail only the possibility, which is provided by the intermediate space 5, of passing the toggle lever movement out of the system. On the one hand, the toggle lever 2 itself can be designed with considerably less mass as a result of its reduction to a length which does not significantly exceed the distance between the base points of action A, B of the jointed links 3, since it need be designed to be flexible only in this region. On the other hand, the intermediate space 5 provided between the double stack drives 10 and 20 makes it possible for the toggle lever movement to be passed out in any required manner, as a result of the fitting of a toggle lever attachment 7 whose head region 71 passes out of the drive system and which can act on further assemblies, and, in particular, makes it possible to hold a tool in the region 71.

The toggle lever attachment 7 is formed from a material whose density is as low as possible and is preferably formed as a part which is profiled with thin walls and withstands predetermined alternating bending, compression and shear stresses. High-strength titanium alloys or carbon fibre composite materials are particularly suitable for this purpose. Furthermore, the toggle lever attachment 7 is preferably designed in accordance with the external forces acting on it and the inertia forces of the toggle lever 2 such that the application of force to the toggle lever attachment 7 on the toggle lever side takes place exclusively in the region of the base points of action A, B of the jointed links 3, as a result of which the toggle lever 2 need absorb only the prestressing force of the piezo-electric stacks and the dynamic forces in the stacks. Without having to influence the drive, the toggle lever attachment 7 can be designed as a low-mass triangular structure which is particularly stiff in the movement direction and has a base width which corresponds essentially to the distance A-B. Resonant frequencies of up to 7 kHz, which are thus 1.4 times higher than on otherwise identical drive according to FIG. 1, can be achieved even with a design according to FIG. 2 and with measures to be complied with in accordance with the figure description relating to FIG. 5.

Figure 3:
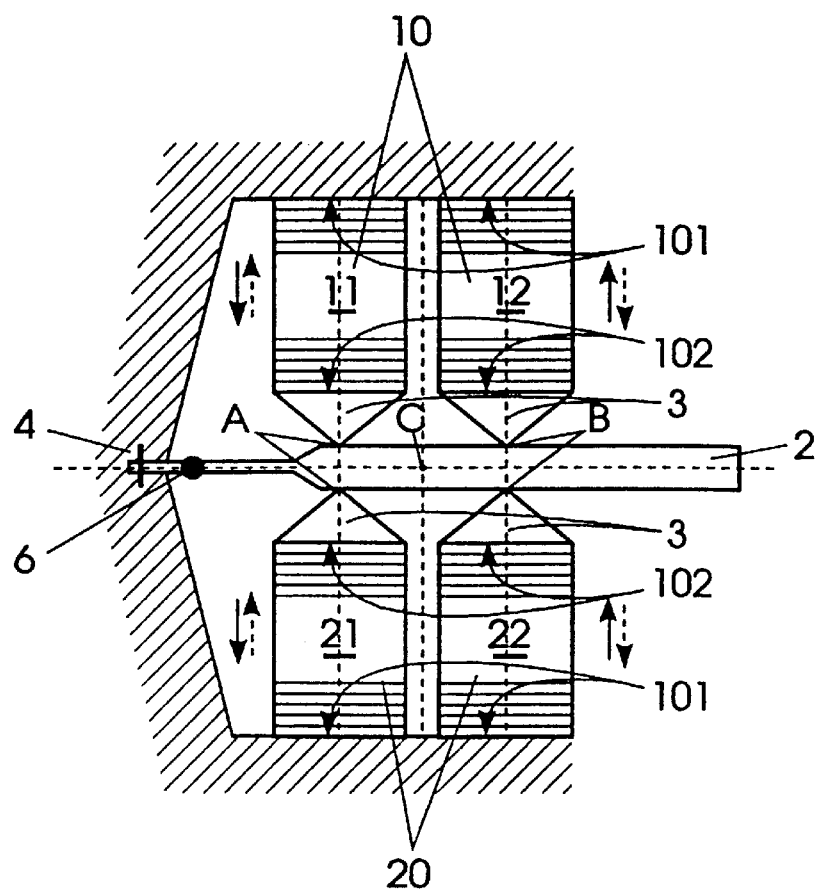
FIG. 3 shows an advantageous embodiment of a highly dynamic drive using two double stack drives according to the present invention.
Figure 3A:
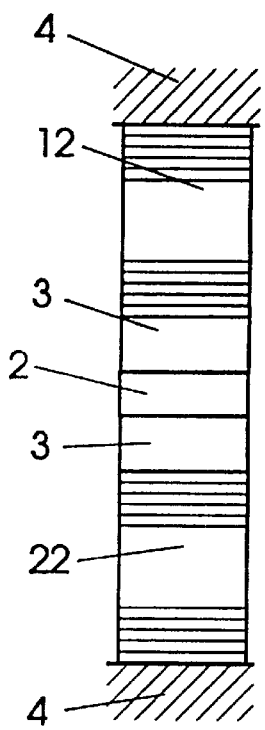
FIG. 3a shows a side view of the layout according to FIG. 3.

FIG. 3 illustrates an advantageous embodiment of a highly dynamic drive using two double stack drives 10, 20. In this embodiment, the double stacks 10, 20 are arranged in mirror-image symmetry opposite one another. The base points of action A, B of the piezo-electric stacks 11, 21 and 12, 22 in each case act oppositely to one another on the toggle lever 2. However, in contrast to the design according to FIG. 2, the prestressing forces are in this case completely compensated for, and this results in better compensation for the dynamic forces during operation of the apparatus. Since the bending moments which act on the toggle lever 2 are far lower because of this compensation and are now governed essentially only by forces acting on the toggle lever 2 from the outside, the toggle lever 2 can be designed to be considerably thinner, which in turn means a lower lever moment of inertia and thus an increased resonant frequency. Furthermore, this embodiment has the advantage that lower bending deformation of the piezo-electric stacks 11, 12, 21, 22 and lower shear loads on the jointed links 3 can be recorded. All these advantages mean an increase in the life of the apparatus. The fixing of the position of the axis of rotation C of the toggle lever 2 is achieved in the illustrated embodiment by a lock on one side, the toggle lever movement being ensured in the z-direction by a schematically indicated bending spring 6. Pendulum arms, which are not illustrated and have joints for stabilization, can likewise be provided in the x-y plane. It is also possible to convert the axis of rotation C, which is imaginary here, into a real axis of rotation by fitting a torsion rod in the z-direction through the axis of rotation C, but this is less suitable for the preferably desired applications of the drive.

Comparable resonant frequencies to those according to FIG. 2 can be achieved with an embodiment according to FIG. 3. The movement direction of the drive which is illustrated in this exemplary embodiment preferably takes place in the y-direction or at an angle of $\leq 45°$ with respect to the y-axis.

First of all, FIG. 4 shows an arrangement which is in principle the same as that described in FIG. 3. The difference from FIG. 3 is indicated by FIG. 4a. Four double stack drives 10, 10', 20 and 20' are provided here, in a comparable manner to the arrangement described for FIG. 2. This version of the invention thus completely combines the advantages of the design options described with respect to FIG. 2 and FIG. 3. The way in which the toggle lever attachment 7 is passed out of the drive system is intended here to indicate only the range of freedom and can, of course, also be carried out as described in FIG. 2. The same assemblies are once again provided with the same reference symbols.

An embodiment of the invention according to this example satisfies the special requirements for very-high dynamic response with good precision. For this reason, this drive is especially particularly suitable for driving an engraving tool for engraving gravure printing cylinders and similar print forms in the graphics industry. In this case, surfaces in the order of magnitude of several square meters have to be worked on using engraving cells having a defined size of 0 ... 200 μm, with a predetermined figure or writing pattern. An engraving needle which is attached to the toggle lever attachment 7 for this purpose is designated 8 in FIG. 4. While operating frequencies of about 4 kHz have been achieved for this purpose with magnetic drives which have been used until now, a drive according to FIG. 4, with a static travel of 100 μm, enables operating frequencies of 8 to 20 kHz. It can likewise be provided for the double stacks 10, 20 to act on the toggle lever 2 in such a manner that their axes $S_1$, $S_2$, $S_3$, $S_4$ (related to the toggle lever plane $K_1$), assume an angle which differs slightly from 90°, in such a manner that a predetermined stress deflection takes place in the direction of the toggle lever lock, as is indicated schematically in FIG. 4b, from the start during operation of the double stacks. This measure has the advantage that the lock is not subjected to any alternating tension-compression stress.

It can be said for all the embodiments which have been described so far that the toggle lever 2 in the context of the invention can preferably likewise be designed to be profiled, T, double-T-profiles or hollow profiles of any required cross-section being conceivable depending on the actual specific application, and it being possible for the profile design to be carried out, in particular, in such a manner that it at the same time forms the holder for the toggle lever attachment 7. Such a possibility is indicated in FIG. 2a by way of example for a large number of conceivable holders, using the example of a dovetail-shaped holder for the toggle lever attachment 7. In addition to the possibility that this provides to change the tool mount easily, it thus also gives the option to change the material in the sense of the invention, since only those assemblies which are subject to high mechanical loads still need be manufactured from steel while, in contrast, low-mass materials such as aluminum alloys, titanium alloys, fibre-reinforced materials or high-stress ceramics, for example, may be used for the toggle lever attachment 7.

On the one hand, as a result of the use of a plurality of double stack drives as described above, the user drives can be designed to be intrinsically smaller which, for the same power rating, means improved cooling as the result of the increased size of the overall stack surface. On the other hand, a more far-reaching improvement in the cooling is achieved by a special design of the piezo-electric stacks, as described with reference to FIG. 5.

Figure 5A:
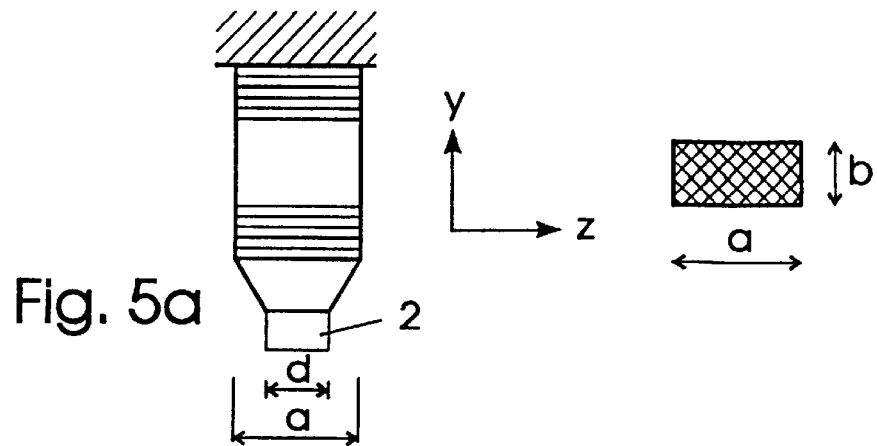
FIGS. 5a to 5d show configurations of individual piezo-electric stacks which may optionally be used in various embodiments of the present invention.

The stack designs which are described in FIGS. 5a to 5d all serve to increase the drive stiffness and thus the resonant frequency and, for comparison reasons, are all based on a predetermined identical distance A-B between the base points of action of the jointed links 3, the illustrations not being to scale, in order to indicate better the individual measures provided. For example, FIG. 5a shows the design of an individual piezo-electric stack which is designed to be broader in the z-direction, which results in a rectangular stack cross-sectional surface. In this case, the stack has a width a in the z-direction, which width a can be designed to be up to virtually twice as large as the width d of the toggle lever 2. This measure, as well as all the other described modifications, results in the drive stiffness being increased by a factor of about 2 with the desirable consequential effects according to the invention. Likewise, because of the increased surface area, the drive experiences improved cooling. A design according to FIG. 5a would be possible in the case of a drive according to FIG. 3.

Figure 5B:
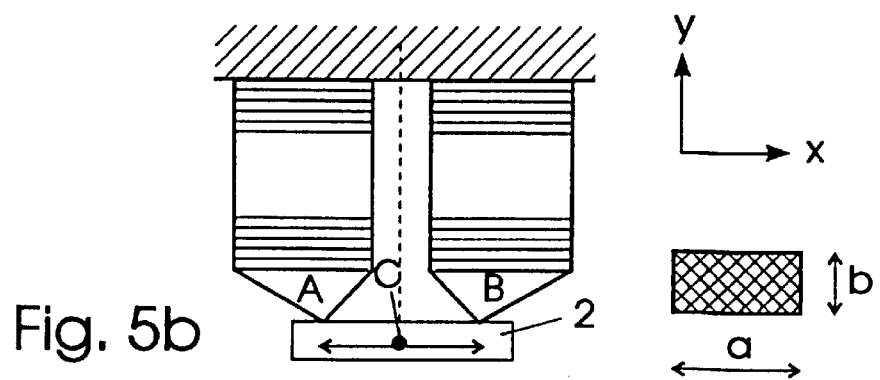

FIG. 5b illustrates an analogous broadening of the stacks in the x-direction. While maintaining the distance A-B, as in the conditions, the illustrated asymmetric base point link becomes necessary in this case. The increase in the drive stiffness from this measure is about 1.5. A design according to FIG. 5b would be possible in the case of a drive according to FIGS. 2 and 4.

Figure 5C:
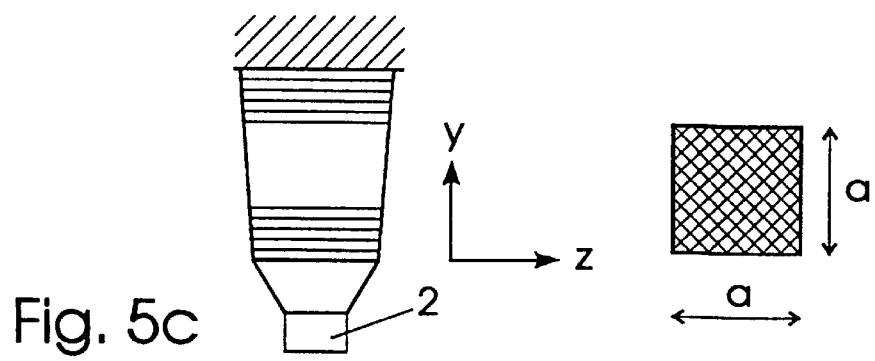
Figure 5D:
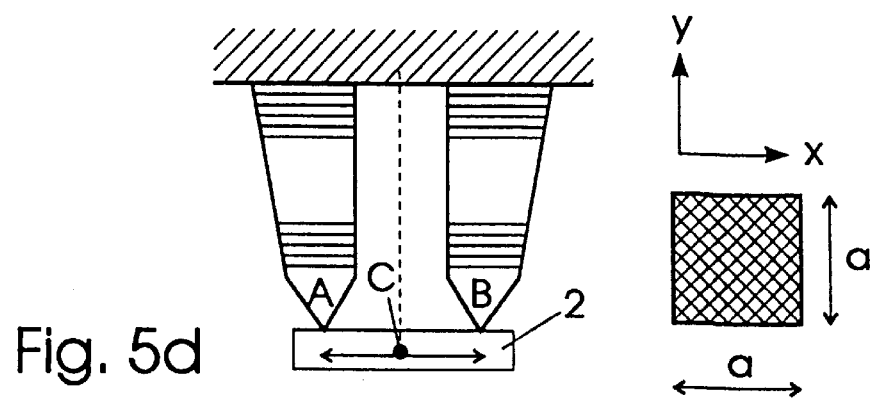

A continuous broadening of the stack cross-section surface areas in the direction of the rigid mount is also possible so that, taking account of all the forces acting, the stresses in the stack are approximately constant. Such a design is illustrated in FIG. 5c, using the example of a square stack cross-sectional surface area. FIG. 5d shows an analogous implementation of the rule according to FIG. 5c, corresponding to FIG. 5b, with the constant distance A-B as predetermined, once again. These measures also result in a reduction in the stack volume in comparison to its heat radiating surface and thus increase the cooling effect. An increase in the drive stiffness of a factor of up to 2 is achieved.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A highly dynamic piezo-electric drive mechanism comprising a toggle lever mounted for movement along a predetermined path of travel, at least two piezo-electric double stack drives arranged with a double stack drive located on each side of said toggle lever in mirror image symmetry and with individual stacks having opposite actions on said toggle lever, said stacks comprising a pair of individual piezo-electric stacks, said stack drives having first and second base surfaces, said first base surfaces being mounted on and acting against a rigid base mounting surface, said piezo-electric stacks expanding and contracting upon application of a phased electrical voltage thereto, a jointed link connecting the second base surface of each of said piezo-electric stacks to said toggle lever at a base point, said base points being located equidistant from an end of said toggle lever, and means for applying an electrical voltage to said piezo-electric double stack drives in such manner that said individual stacks of each double stack drive expand and contract and thereby operate in a push-pull mode.

2. A piezo-electric drive mechanism according to claim 1 wherein two piezo-electric double stack drives are mounted on the same side of said toggle lever with a predetermined distance between said two double stack drives and with the individual stacks of said double stack drives having the same action being located on the same side of said toggle lever.

3. A piezo-electric drive mechanism according to claim 2 wherein said toggle lever has a length which only significantly exceeds the distance between said base points of said jointed links.

4. A piezo-electric drive mechanism according to claim 1 including means for fixing the location of said pivot axis of said toggle lever.

5. A piezo-electric drive mechanism according to claim 4 wherein said pivot axis fixing means comprises means for mounting said toggle lever on a rigid mounting surface at a location spaced from said pivot axis while permitting said toggle lever to pivot about said pivot axis.

6. A piezo-electric drive mechanism according to claim 5 wherein said pivot axis fixing means comprises a bending spring.

7. A piezo-electric drive mechanism according to claim 5 wherein said pivot axis fixing means comprises a pendulum arm.

8. A piezo-electric drive mechanism according to claim 5 wherein said pivot axis fixing means comprises a torsion rod.

9. A piezo-electric drive mechanism according to claim 5 wherein said pivot pin fixing means comprises an axial bearing.

10. A piezo-electric drive mechanism according to claim 2 including motion transfer means mounted on said toggle lever between said double stack drives and extending outwardly beyond said double stack drives for transferring the motion of said toggle lever to a location beyond said double stack drives.

11. A piezo-electric drive mechanism according to claim 10 wherein said motion transfer means is formed as a part which is profiled with thin walls.

12. A piezo-electric drive mechanism according to claim 11 wherein said motion transfer means comprises a triangular member having a base connected to said toggle lever at points equidistant from said pivot axis of said toggle lever and substantially the same distance therefrom as said base points of connection as said jointed links.

13. A piezo-electric drive mechanism according to claim 12 wherein said motion transfer member is removably mounted on said toggle lever.

14. A piezo-electric drive mechanism according to claim 10 including tool means carried by said motion transfer means outside said double stack drives.

15. A piezo-electric drive mechanism according to claim 14 wherein said tool means comprises an engraving tool for engraving print forms into gravure printing cylinders.

16. A piezo-electric drive mechanism according to claim 1 wherein said first and second base surfaces of said individual stacks are rectangular in cross-section.

17. A piezo-electric drive mechanism according to claim 16 wherein said individual stacks define a frustum from said first base surface to said second base surface.

18. A piezo-electric drive mechanism according to claim 16 wherein said individual stacks of said double stack drives are shaped such that their axes define an angle different than 90° relative to the plane of said toggle lever.

19. A piezo-electric drive mechanism according to claim 2 wherein said toggle lever is substantially rigid.

20. A piezo-electric drive mechanism according to claim 10 wherein said motion transfer means has a profile.

21. A piezo-electric drive mechanism according to claim 10 wherein said motion transfer means is removably clamped to said toggle lever.

22. A piezo-electric drive mechanism according to claim 1 wherein said toggle lever has a profiled shape.

* * * * *

UNITED STATES PATENT AND TRADEMARK OFFICE
CERTIFICATE OF CORRECTION

PATENT NO. : 5,942,837

DATED : August 24, 1999

INVENTOR(S) : Reuter

It is certified that error appears in the above-identified patent and that said Letters Patent is hereby corrected as shown below:

Title page, [56] References Cited, FOREIGN PATENT DOCUMENTS, insert:

--WO96/19836   6/1996   PCT--.

Signed and Sealed this

Twenty-ninth Day of February, 2000

Attest:

Attesting Officer

Q. TODD DICKINSON

Commissioner of Patents and Trademarks